(12) United States Patent
Jia et al.

(10) Patent No.: US 11,341,593 B2
(45) Date of Patent: May 24, 2022

(54) BOARDING POINT DETERMINATION METHOD AND BOARDING POINT DETERMINATION DEVICE

(71) Applicants: Nissan Motor Co., Ltd., Kanagawa (JP); RENAULT S.A.S., Boulogne-Billancourt (FR)

(72) Inventors: Shuyang Jia, Kanagawa (JP); Naoki Kojo, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/255,578

(22) PCT Filed: Jun. 26, 2018

(86) PCT No.: PCT/IB2018/000798
§ 371 (c)(1),
(2) Date: Dec. 23, 2020

(87) PCT Pub. No.: WO2020/002960
PCT Pub. Date: Jan. 2, 2020

(65) Prior Publication Data
US 2021/0158469 A1    May 27, 2021

(51) Int. Cl.
*G06Q 50/30*    (2012.01)
*G06Q 10/02*    (2012.01)
*G06V 20/56*    (2022.01)

(52) U.S. Cl.
CPC .............. *G06Q 50/30* (2013.01); *G06Q 10/02* (2013.01); *G06V 20/56* (2022.01)

(58) Field of Classification Search
CPC ...... G06Q 50/30; G06Q 10/02; G06K 9/00791
(Continued)

(56) References Cited

U.S. PATENT DOCUMENTS

2011/0246404 A1* 10/2011 Lehmann ............... G06Q 50/14
                                                             706/21
2015/0324718 A1* 11/2015 Lord .................... G06Q 10/047
                                                             705/7.13
(Continued)

FOREIGN PATENT DOCUMENTS

CN    106157600 A    11/2016
JP    2004-62490 A    2/2004
(Continued)

OTHER PUBLICATIONS

"GIS-based identification and assessment of suitable meeting point locations for ride-sharing" by Czioska et al., (Year: 2017).*

*Primary Examiner* — Zeina Elchanti
(74) *Attorney, Agent, or Firm* — Osha Bergman Watanabe & Burton LLP

(57) ABSTRACT

A vehicle allocation system is provided, which operates to move a vehicle to a predetermined point in response to a request from a user. The vehicle allocation system includes a boarding point determination apparatus, a control apparatus, and a user terminal apparatus. The boarding point determination apparatus includes a processor that operates to specify a second user who is expected to board in a predetermined range including a point associated with a first user, and calculate as the predetermined point a common point at which users including at least the first user and the second user board.

25 Claims, 9 Drawing Sheets

(58) Field of Classification Search
  USPC .......................................................... 705/13
  See application file for complete search history.

(56) References Cited

U.S. PATENT DOCUMENTS

| | | | |
|---|---|---|---|
| 2016/0027306 A1* | 1/2016 | Lambert | G01C 21/3438 |
| | | | 701/117 |
| 2016/0370194 A1 | 12/2016 | Colijn et al. | |
| 2017/0169366 A1* | 6/2017 | Klein | G06Q 50/30 |
| 2018/0129981 A1 | 5/2018 | Fujimoto | |
| 2018/0366004 A1* | 12/2018 | Laetz | G08G 1/202 |
| 2019/0286126 A1* | 9/2019 | Williams | G05D 1/0088 |
| 2019/0370922 A1* | 12/2019 | Asghari | G06Q 50/30 |
| 2020/0057967 A1* | 2/2020 | Ratti | G06Q 10/02 |
| 2020/0302798 A1* | 9/2020 | Zhang | G08G 1/202 |

FOREIGN PATENT DOCUMENTS

| | | |
|---|---|---|
| JP | 2008-268080 A | 11/2008 |
| JP | 2017-191371 A | 10/2017 |
| JP | 2018-73351 A | 5/2018 |

\* cited by examiner

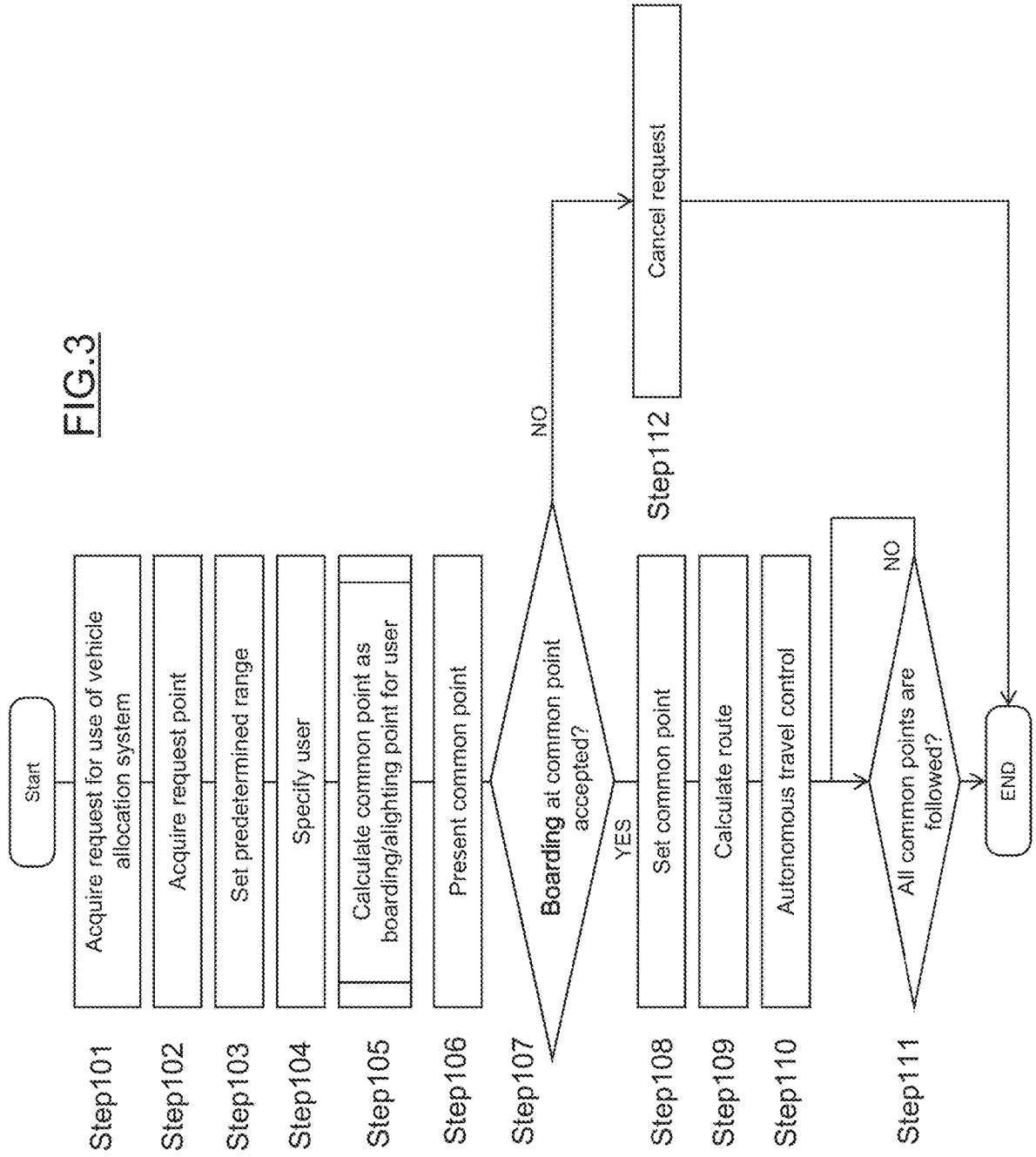

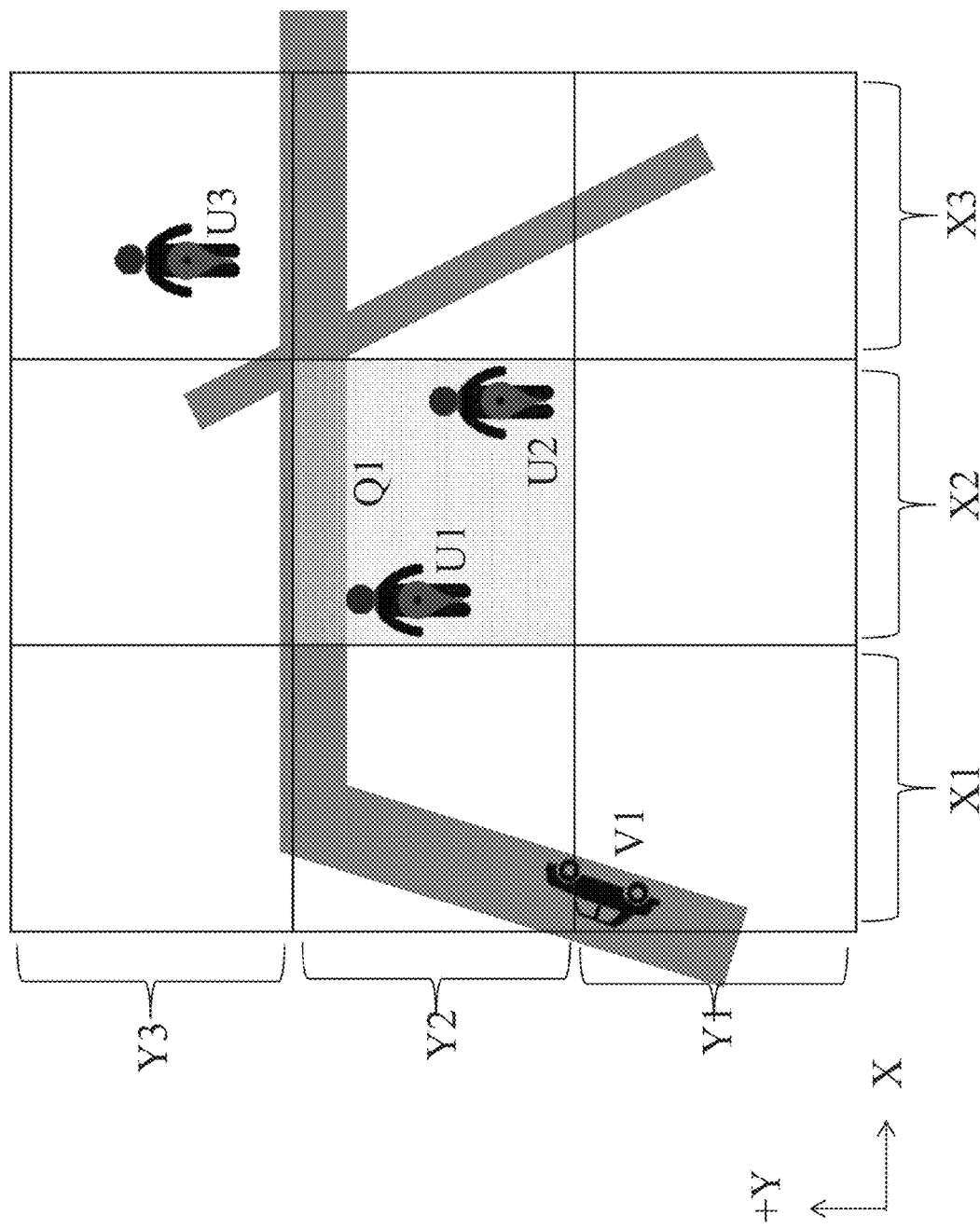

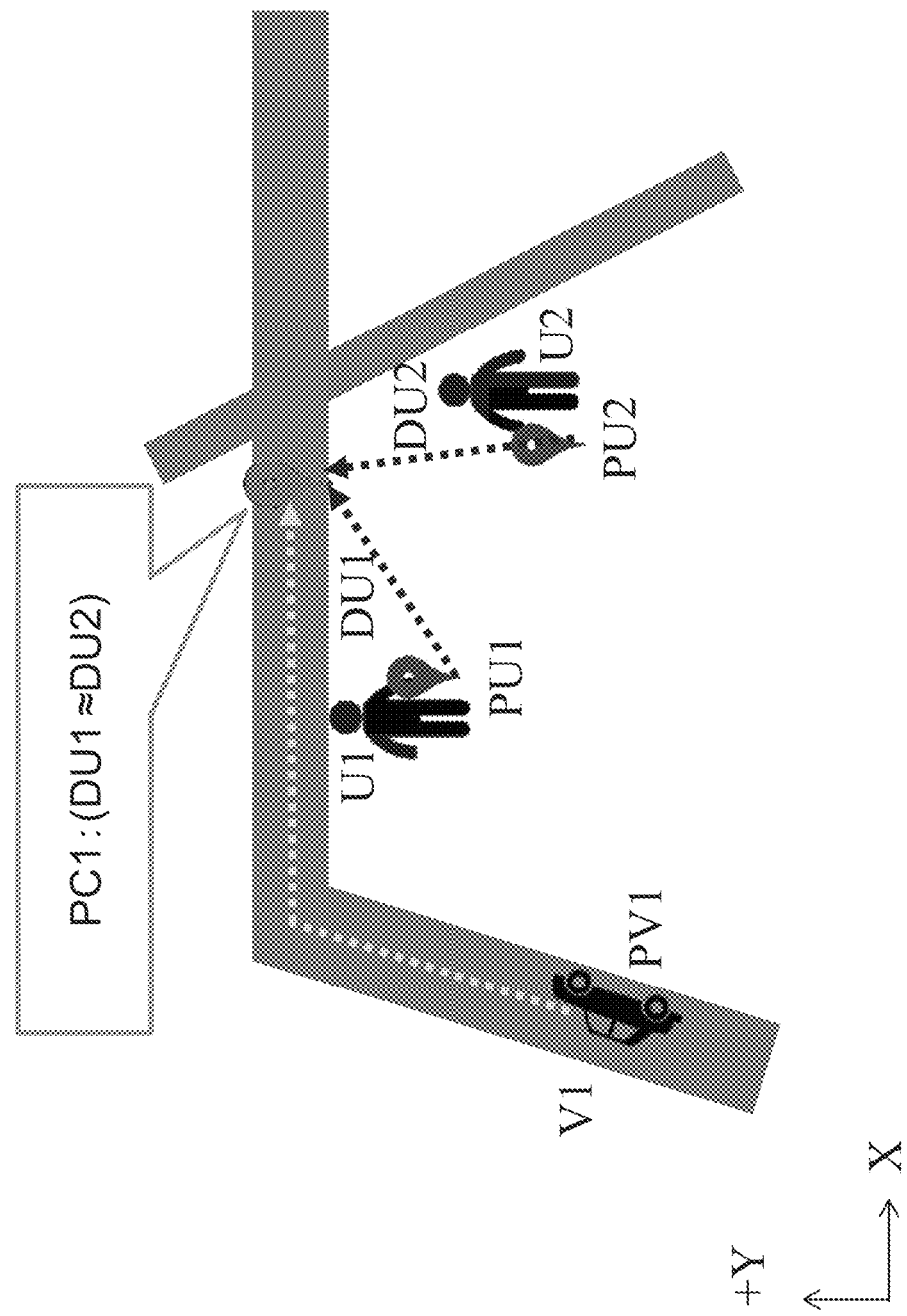

BOARDING POINT DETERMINATION METHOD AND BOARDING POINT DETERMINATION DEVICE

TECHNICAL FIELD

The present invention relates to a boarding point determination method and a boarding point determination apparatus that are used in a vehicle allocation system.

BACKGROUND ART

A system is known, which is configured to calculate one or more recommended boarding/alighting points on the basis of an access difficulty level for a user to reach the user's boarding/alighting point from a point requested by the user and allocate a vehicle to the boarding/alighting point selected by the user (Patent Document 1).

PRIOR ART DOCUMENT

Patent Document

[Patent Document 1] US2016/0370194A

SUMMARY OF INVENTION

Problems to be Solved by Invention

If the boarding/alighting points are determined in response to individual requests made by respective users, the boarding/alighting points may be set at positions close to each other. When the vehicle follows all the set boarding/alighting points, the vehicle has to make frequent stops, thus resulting in a problem in that the trip time increases.

A problem to be solved by the present invention is to provide a boarding point determination method and a boarding point determination apparatus that prevent a vehicle from making frequent stops and suppress an increase in the trip time while responding to a request from each user.

Means for Solving Problems

The present invention solves the above problem through specifying a second user who is expected to board in a predetermined range including a point associated with a first user and calculating a common point at which users including at least the first user and the second user board.

Effect of Invention

According to the present invention, it is possible to prevent a vehicle from making frequent stops and suppress an increase in the trip time while responding to a request from each user who desires the use of a vehicle allocation system.

BRIEF DESCRIPTION OF DRAWINGS

FIG. 3 is a chart illustrating an example of a control procedure executed in the vehicle allocation system including the boarding point determination apparatus.

FIG. 4A is a diagram illustrating a first example of a scheme of setting a predetermined range in one or more embodiments of the present invention.

FIG. 5C is a diagram illustrating a third example of a scheme of calculating a common point for boarding.

MODE(S) FOR CARRYING OUT THE INVENTION

Hereinafter, one or more embodiments of the present invention will be described with reference to the drawings. The embodiments will be described by exemplifying a case in which the boarding point determination method and the boarding point determination apparatus are applied to a vehicle allocation system.

Figure 1:
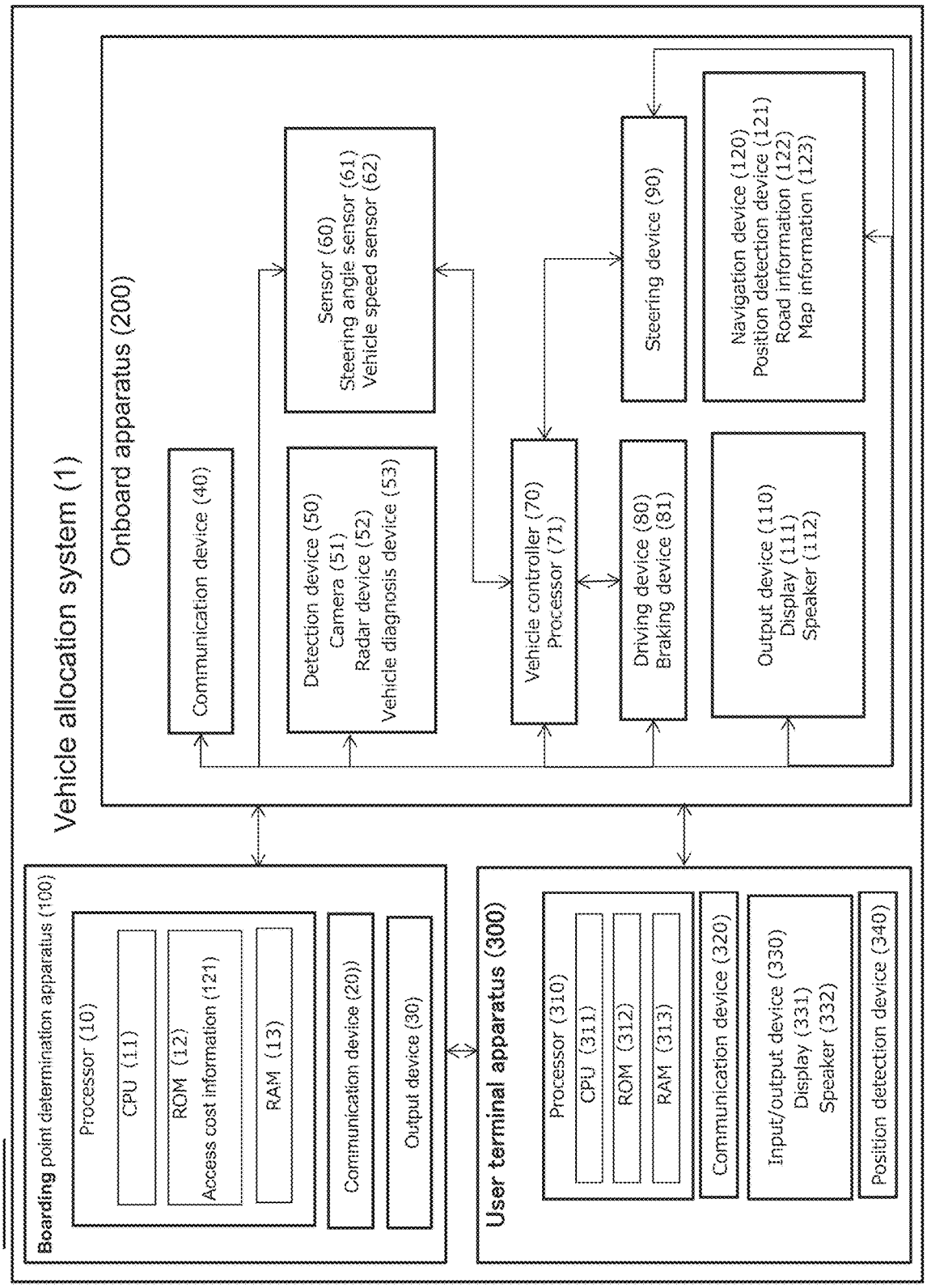
FIG. 1 is a block configuration diagram of a vehicle allocation system including a boarding point determination apparatus according to one or more embodiments of the present invention.

FIG. 1 is a diagram illustrating the block configuration of a vehicle allocation system 1. The vehicle allocation system 1 according to one or more embodiments of the present invention includes a boarding point determination apparatus 100, a control apparatus 200 of a vehicle, and a user terminal apparatus 300. Each apparatus includes a processor (computer) that executes a calculation process and a communication device. The boarding point determination apparatus 100, the control apparatus 200 of a vehicle, and the user terminal apparatus 300 each have a communication function and exchange information with one another by wire communication or wireless communication.

One or more embodiments of the present invention will be described for the vehicle allocation system 1 including the boarding point determination apparatus 100 which primarily performs a process of determining a boarding point.

After boarding, the user is to alight, so the boarding point determination apparatus 100 also performs a process of determining the boarding point. The scheme of determining the alighting point is not particularly limited. Alighting point may be determined based on a user's request, or a predetermined point (destination) may be determined as an alighting point drop-off point. For example, when it is decided to alight/stop at a stadium, the user can board at the point (destination) by the user.

In the vehicle allocation system 1 according to one or more embodiments of the present invention, the boarding point determination apparatus 100 is provided in a separate server apparatus capable of communicating with the control apparatus 200 and the user terminal apparatus 300. The boarding point determination apparatus 100 may also be provided in the control apparatus 200 equipped in a vehicle. The boarding point determination apparatus 100 can communicate with the control apparatus 200 and another user terminal apparatus 300 and exchanges information including requests.

The user terminal apparatus 300 includes a processor 310, a communication device 320, an input/output device 330, and a position detection device 340 that responds to the global positioning system (GPS) or the like. The processor 310 controls operations of the communication device 320 and the input/output device 330. The input/output device 330 includes a display 331, a speaker 332, and a microphone for voice input, which is not illustrated. The display 331 is a touch panel-type display that has both an output (display) function and an input reception function. The display 331 receives an input from a user. The processor 310 generates a request that is an electronic command in response to an input operation, and transmits the request to the boarding point determination apparatus 100 via the communication device 320. The processor 310 acquires a boarding point (predetermined point) calculated by the boarding point determination apparatus 100 and displays it on the display 331. The processor 310 may display one or more predetermined points on the display 331. The predetermined points include a request point (a current location, a desired boarding point, an expected point at which boarding is desired, or a boarding point based on the past history) and a common point, which are each a point before being set as a boarding point. The presentation form of each point is not particularly limited. A point on the map may be displayed with a mark such as a pin or a flag, and/or the address of a point may be displayed as text on the display 331 or may also be output as voice via the speaker 332. The processor 310 acquires a vehicle allocation plan created by the vehicle allocation system 1 and displays the vehicle allocation plan on the display 331. The vehicle allocation plan includes a vehicle to be allocated, a travel route for the vehicle, a time of arrival at each predetermined point, and a time of arrival at a point at which a user boards. The processor 310 controls the speaker 332 to output an alert when receiving a new vehicle allocation plan, a change in the vehicle allocation plan, or the like.

The boarding point determination method according to one or more embodiments of the present invention is carried out by the boarding point determination apparatus 100. As illustrated in FIG. 1, the boarding point determination apparatus 100 according to one or more embodiments of the present invention is provided as an apparatus that is configured independently of the control apparatus 200 and the user terminal apparatus 300. In this case, the boarding point determination apparatus 100 serves as a server apparatus configured on a network through which communication is possible with the control apparatus 200 of a vehicle and the user terminal apparatus 300. The boarding point determination apparatus 100 is not limited in its installation form and may also be equipped in the control apparatus 200.

The vehicle according to one or more embodiments of the present invention has an autonomous travel function. The control apparatus 200 of a target vehicle controls the target vehicle to execute autonomous traveling. The target vehicle is allocated to be used by one or more users. The automated driving (autonomous traveling) may be unmanned fully automated driving or may also be manned partially automated driving. The scheme of autonomous traveling is not particularly limited. The control apparatus 200 recognizes a lane in which the target vehicle (subject vehicle) is traveling, and controls the movement of the target vehicle so that the position of a lane marker of the lane and the position of the target vehicle maintain a predetermined relationship. The control apparatus 200 controls the movement of the target vehicle so that the distance along the road width direction from a lane marker of a lane for vehicles to travel to the target vehicle (i.e., the lateral position of the target vehicle) falls within a predetermined value range. The lane marker is not limited, provided that it has a function of defining a lane. Examples of the lane marker may include line figures drawn on a road surface, luminous bodies embedded in a road, plants existing between lanes, and road structures existing on the road shoulder side of a lane, such as guardrails, curbstones, sidewalks, and exclusive roads for two wheels. The target vehicle to be selected is a vehicle that allows a user to board the earliest in response to the user's request.

As illustrated in FIG. 1, the control apparatus 200 of a vehicle according to one or more embodiments of the present invention includes a communication device 40, a detection device 50, a sensor 60, a vehicle controller 70, a driving device 80, a steering device 90, an output device 110, and a navigation device 120. These devices which constitute the control apparatus 200 are connected to one another via a controller area network (CAN) or other onboard LAN to mutually exchange information.

The detection device 50 detects the situation around the target vehicle. The detection device 50 detects the existence and existence position of an object existing around the target vehicle. Although not particularly limited, the detection device 50 according to one or more embodiments of the present invention includes a camera 51. The camera 51 is disposed at a predetermined position of the target vehicle and captures images around the target vehicle. The camera 51 according to one or more embodiments of the present invention is an imaging device including an imaging element such as a CCD or a CMOS. The camera 51 may also be an infrared camera or a stereo camera.

The detection device 50 according to one or more embodiments of the present invention has a radar device 52. Examples of the radar device 52 may be those, such as millimeter-wave radar, laser radar, and ultrasonic radar, which are known at the time of filing the present application. The detection device 50 processes the acquired measurement data to acquire the distance from the target vehicle to an object existing around the target vehicle and/or the direction in which the object exists with respect to the target vehicle, on the basis of the position of the object.

The above-described camera 51 and radar device 52 may be those disposed outside the vehicle. For example, detection information acquired by a camera 51 and/or a radar device 52 provided in a road facility may be acquired via an external device of the intelligent transport system (ITS) or the like.

The sensor 60 according to one or more embodiments of the present invention includes a steering angle sensor 61 and a vehicle speed sensor 62. The steering angle sensor 61 detects a traveling direction based on steering information regarding the steering, such as the steering amount, steering speed, and steering acceleration of the target vehicle, and transmits the detected traveling direction to the vehicle controller 70. The vehicle speed sensor 62 detects a traveling speed (including zero when stopping) based on the traveling direction of the target vehicle, the vehicle speed/acceleration of the target vehicle, etc. and transmits the detected traveling speed to the vehicle controller 70.

The vehicle controller 70 according to one or more embodiments of the present invention is an onboard computer such as an electronic control unit (ECU) and electronically controls the driving of the vehicle. The vehicle controller 70 includes a processor 71 that executes a process of the automated driving (autonomous traveling). The vehicle according to one or more embodiments of the present invention may be, for example, an electric car having an electric motor as the traveling drive source, an engine car having an internal-combustion engine as the traveling drive source, or a hybrid car having both an electric motor and an internal combustion engine as the traveling drive sources.

Examples of the electric car or hybrid car having an electric motor as the traveling drive source include a type in which the power source for the electric motor is a secondary battery and a type in which the power source for the electric motor is a fuel cell.

The driving device 80 according to one or more embodiments of the present invention includes a drive mechanism of the target vehicle. The drive mechanism includes an electric motor and/or an internal-combustion engine as the above-described traveling drive sources, a power transmission device including a drive shaft and an automatic transmission that transmit the output of the traveling drive sources to the drive wheels, and a braking device 81 that brakes the wheels. The driving device 80 generates respective control signals for these components of the drive mechanism and executes the travel control including acceleration/deceleration of the vehicle. These control signals for the drive mechanism are generated on the basis of input signals by an accelerator operation and a brake operation and control signals acquired from the vehicle controller 70. Control information may be transmitted to the driving device 80, which can thereby perform the travel control including acceleration/deceleration of the vehicle in an automated or autonomous manner. In the case of a hybrid car, the driving device 80 may receive a ratio of the torque output to the electric motor and the torque output to the internal-combustion engine in accordance with the traveling state of the vehicle.

The steering device 90 according to one or more embodiments of the present invention includes a steering actuator. The steering actuator includes a motor and other necessary components attached to the steering column shaft. The steering device 90 executes the control of changing the traveling direction of the vehicle on the basis of a control signal acquired from the vehicle controller 70 or an input signal by the steering operation. The vehicle controller 70 transmits the control information including the steering amount to the steering device 90 thereby to execute the control of changing the traveling direction.

The navigation device 120 has a position detection device 121, road information 122 on the road type (right/left turn lane), road width, road shape, and others, and map information 123 including the road information 122. The navigation device 120 calculates a route from the current location detected by the position detection device 121 to the destination and a way point on the route and outputs the route information and the current location to the vehicle controller 70 of the target vehicle. Any of predetermined points (including the common point) based on the request points of users is the way point or destination of the target vehicle.

The vehicle controller 70 controls the vehicle to travel autonomously in accordance with the route acquired from the navigation device 120. The vehicle controller 70 also controls the vehicle to make a stop autonomously at the way point (predetermined point) acquired from the navigation device 120. At the way point (predetermined point), the vehicle controller 70 controls the vehicle to execute unlocking and opening a door and then execute closing and locking the door after a predetermined time. The vehicle controller 70 controls the vehicle to start and move to the next way point (predetermined point).

The output device 110 according to one or more embodiments of the present invention outputs information regarding the driving action based on a driving plan. Execution of the steering operation and/or acceleration/deceleration is notified as the information regarding the driving action via a display 111 and/or a speaker 112. Additionally or alternatively, the output device 110 according to one or more embodiments of the present invention may output various information items regarding the travel assistance to an external device of the intelligent transport system (ITS) or the like via the communication device 40.

The user terminal apparatus 300 will be described. The user terminal apparatus 300 is a small computer, such as a personal digital assistant (PDA) or a smartphone, which can be carried by a user. As illustrated in FIG. 1, the user terminal apparatus 300 includes the processor 310, the communication device 320, and the input/output device 330. The user terminal apparatus 300 exchanges information with the control apparatus 200 of a vehicle and/or the boarding point determination apparatus 100 via the communication device 320.

The input/output device 330 includes the display 331 and the speaker 332. The display 331 is a touch panel-type display. The display 331 receives the input of a request from a user. The request includes information associated with the user. The request includes a request point, user identification information, reservation date and time, information for specifying a reserved vehicle, an attribute of the user, a preference of the user, a travel history of the user, a history of the boarding/alighting points of the user, etc. The request is transmitted to the boarding point determination apparatus 100. Request points include a boarding point, an alighting point, a destination, and a current location. Each request point includes information on the point obtained from the information associated with the user who made the request, in addition to information on the point included in the request. Request points include a boarding point, an alighting point, and a destination that are expected on the basis of the user's travel history and/or boarding/alighting history. Request points further include a boarding point, an alighting point, and a destination that are calculated on the basis of the user's preference. Request points are included in predetermined points for the vehicle allocation.

The boarding point determination apparatus 100 according to one or more embodiments of the present invention will be described below. The boarding point determination apparatus 100 according to one or more embodiments of the present invention constitutes a part of the vehicle allocation system 1. The boarding point determination apparatus 100 exchanges information with the control apparatus 200 of a vehicle and the user terminal apparatus 300. The boarding point determination apparatus 100 calculates the common point as a boarding point at which one or more users board a vehicle.

The boarding point determination apparatus 100 according to one or more embodiments of the present invention is a server configured on a communication network. The boarding point determination apparatus 100 determines a boarding point, creates a vehicle allocation plan, and generates an execution command for a vehicle allocation process. Separate processors may be equipped for creating the vehicle allocation plan and generating the execution command for the vehicle allocation process, but in the present example, a processor 10 of the boarding point determination apparatus 100 executes the vehicle allocation process in an integrated manner.

As illustrated in FIG. 1, the boarding point determination apparatus 100 according to one or more embodiments of the present invention includes the processor 10, a communication device 20, and an output device 30. The communication device 20 exchanges information with the control apparatus

200 of a vehicle and/or the user terminal apparatus 300. The output device 30 presents the calculation result as necessary.

The processor 10 of the boarding point determination apparatus 100 is a computer including a read only memory (ROM) 12 that stores programs for executing the movement of a target vehicle to be allocated to one or more predetermined points including the calculated common point, a central processing unit (CPU) 11 as an operation circuit that executes the programs stored in the ROM 12 to serve as the boarding point determination apparatus 100, and a random access memory (RAM) 13 that serves as an accessible storage device.

The processor 10 of the boarding point determination apparatus 100 according to one or more embodiments of the present invention has a request acquisition function, a predetermined range setting function, a user specifying function, and a common point calculation function. The control device 10 according to one or more embodiments of the present invention executes each function by cooperation of software for achieving the above functions and the above-described hardware.

Figure 2:
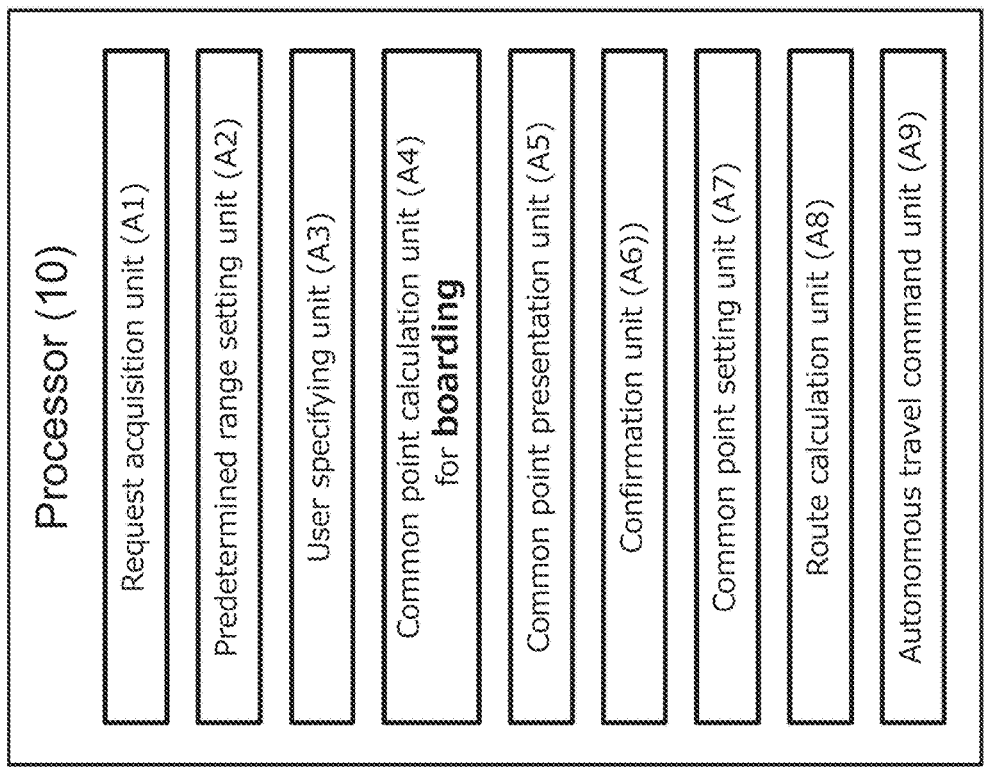
FIG. 2 is a block configuration diagram of a processor of the boarding point determination apparatus illustrated in FIG. 1.

As an example, FIG. 2 illustrates functional blocks of the processor 10. As illustrated in FIG. 2, the processor 10 according to one or more embodiments of the present invention includes a request acquisition unit A1 that acquires a request, a predetermined range setting unit A2 that sets a predetermined range, a user specifying unit A3 that specifies a user, a common point calculation unit A4 that calculates a common point for boarding, a common point presentation unit A5 that presents the common point, a confirmation unit A6 that confirms an acceptance from a user, a common point setting unit A7 that sets the common point, a route calculation unit A8 that calculates a route, and an autonomous travel command unit A9 that controls a vehicle to travel autonomously. Each unit of the processor 10 calculates an operation command for performing each of the above processes and transmits the command to the control apparatus 200 or user terminal apparatus 300 in which the calculated operation command is executed.

The vehicle allocation system 1 according to one or more embodiments of the present invention includes a plurality of vehicles and controls each vehicle to move to a predetermined point in response to the request from a user. Predetermined points include a boarding point or alighting point desired by a user or a current location or destination of a user.

The vehicle allocation system 1 may control a vehicle to move to a predetermined point on the basis of the request from a single user. This is a case in which a vehicle with no occupant (empty vehicle) moves to a request point of a user who desires boarding, on the basis of the request from the user. The vehicle allocation system 1 may control a vehicle to move to a predetermined point on the basis of the requests from a plurality of users. This is a case in which a plurality of users is allowed to board or a case in which a vehicle with one or more users already on board moves to another user's boarding point (request point or common point).

The boarding point determination apparatus 100, which is a server apparatus, at least temporarily stores vehicle information acquired from the control apparatuses 200 of a plurality of vehicles that can be targets of vehicle allocation. The vehicle information includes general information indicating a vehicle state managed by a vehicle, such as the positional information, traveling direction, vehicle speed, steering amount, remaining energy amount, door lock information, seat belt attachment/detachment information, seating information, and automated (autonomous) driving situation of the vehicle, which are associated with the identification information of the vehicle. The boarding point determination apparatus 100 stores information regarding vehicle allocation control, such as a request for vehicle allocation, an execution situation (progress information) of a vehicle allocation plan, the presence/absence and number of users on board, a boarding/alighting status (progress of boarding/alighting in the vehicle allocation plan), arrival at a predetermined point, and specifying of the next predetermined point. The information regarding the vehicle allocation control is associated with identification information of a vehicle and/or identification information of a user. The boarding point determination apparatus 100 stores the request from a user, past requests from the user, a past use history of the user, an attribute of the user, and a requirement from the user, which are associated with the identification information of the user.

Each function of the boarding point determination apparatus 100 according to one or more embodiments of the present invention will then be described along the control procedure. FIG. 3 illustrates an example of a control procedure executed in the vehicle allocation system 1 including the boarding point determination apparatus 100.

In step 101, the processor 10 acquires the request from a user who desires the use of the vehicle allocation system. The request includes a request point, request date and time, user identification information, information for specifying a reserved vehicle, an attribute of the user, a requirement from the user, a preference of the user, a usage history of the user, a history of the boarding/alighting points of the user, etc.

Information included in a request will be described.

Request points include the current location of a user or a boarding point desired by the user. The current location is a point at which a user is located. It is convenient for a user that the current location and the boarding point are close to each other because the movement amount of the user is small. The request point may be one of a plurality of points including stop-off points (way points). The request point may be represented by coordinate values such as latitude and longitude or may also be represented by identification information of a facility such as a stop or a station. The request point does not necessarily require positional information (coordinate values). The position in the identification information is acquired with reference to the map information 123. The request in which the current location of a user is set as the request point is a requirement from the user who desires the vehicle allocation to the location at which the user is located (current location). The request in which the boarding point designated by a user is set as the request point is a requirement from the user who desires the vehicle allocation to a point desired by the user.

Request points included in the requests for desired boarding include a boarding point desired by a user, the current location of the user, or a boarding point at which a user is expected to board. Information on the expected boarding point includes a preference of the user, a usage history of the user, and a history of past boarding points. The current location as the request point may be represented by a detection result of the position detection device 340 of the user terminal apparatus 300. The current location detected by the position detection device 340 may be automatically transmitted at a predetermined cycle to the vehicle allocation system including the boarding point determination apparatus 100 via the communication device 320. After boarding, the user is to alight. A request for alighting may be transmitted to the vehicle allocation system 1 together with the request for boarding.

Request points included in the requests for desired alighting include an alighting point desired by a user, the destination of a user, or an alighting point at which a user is expected to alight. Information on the expected alighting point includes a preference of the user, a usage history of the user, and a history of past alighting points. The destination as the request point may be represented by input information of a route search or the like input to the user terminal apparatus 300 or may also be represented by an estimation result based on the user's schedule or action history. The destination estimated by the processor 310 may be automatically transmitted to the vehicle allocation system 1 determination apparatus 100 via the communication device 320. According to one or more embodiments of the present invention, the alighting point is not particularly limited, and may be a predetermined point (a stadium gate) or the like.

The user identification information is information for specifying a user. The request date and time are the date and time at which the vehicle allocation is desired (the date and time at which the boarding is desired or the date and time at which the alighting is desired (the time slot in which the boarding is desired or the time slot in which the alighting is desired)). The information for specifying a vehicle is information for a user to specify a desired vehicle. Examples of the desired vehicle include those having functions that satisfy the needs of users, such as a vehicle that can accommodate a desired number of users, a vehicle that can store a suitcase, a vehicle that can store a wheelchair, and a vehicle that is equipped with a child seat.

Attributes of a user include the user's age, user's gender, user's preference, user's schedule, user's usage history, history of the user's boarding/alighting points, and the form of a baggage carried by the user (a suitcase, a luggage having a predetermined size or more, or a luggage having a predetermined length or more). The requirement from a user includes information as to whether to accept or refuse ride-sharing.

The requirement from a user includes a required matter regarding movement. The vehicle allocation plan is created with reference to the requirement from a user. In one or more embodiments of the present invention, the designation of a request point is received, but the point for a vehicle to actually pick up an occupant may be a common point different from the request point; therefore, a user may be required to move to the common point or move from the common point to a destination. The user can preliminarily provide a restriction on the required movement in the request. The restriction on movement can be designated as a restriction value on any of a distance, a movement time, a walking time, and an altitude difference. By including this restriction in the request, it is possible to refuse boarding or alighting at a common point that requires movement of a restriction value (such as a restriction distance) or more. When a restriction on movement is provided, the user is required to move within the restricted range, which the user sets for himself/herself, around the boarding or alighting.

For example, when boarding, the user can board at a common point to which the walking time is X minutes or less or the walking distance is a certain distance or less from the request point (the current location, a desired boarding point, or an expected boarding point) and at which the user can arrive along a route with an up-and-down slope (an altitude difference) of Y m or less. When alighting, the user can alight at a common point to which the walking time is X minutes or less or the walking distance is a certain distance or less from the request point (the destination, a desired alighting point, or an expected alighting point) and at which the user can arrive along a route with an up-and-down slope (an altitude difference) of Y m or less.

In step 102, the processor 10 acquires a request point included in the request. Request points regarding the boarding include a desired boarding point, the current location, an expected point at which the user desires to board, and a point at which the user tends to board. Request points regarding the alighting include a desired alighting point, the destination, an expected point at which the user desires to alight, and a point at which the user tends to alight. The destination in the request for alight is a point to which the user moves after alighting.

The processor 10 can calculate and obtain the request point from information associated with the user included in the request. The processor 10 may calculate the user's boarding or alighting point from the user's schedule included in the request. The processor 10 may estimate a destination at which the user stops off from the user's preference included in the request and calculate a boarding or alighting point for reaching the destination. The processor 10 may estimate a destination at which the user stops off from the history of the user included in the request and calculate a boarding or alighting point for reaching the destination.

In step 103, the processor 10 sets a predetermined range. The predetermined range is a range in which one trip (vehicle allocation service) for moving a vehicle is performed in response to the requests from users.

The predetermined range may be an area that is preliminarily set. A predetermined section may be defined as the predetermined range on the basis of the latitude and longitude (coordinates) on the map information 123. For example, as illustrated in FIG. 4A, a predetermined range Q1 may be set as a range that is preliminarily defined by (X2, Y2) in accordance with a mesh section of the map information 123. The shape of the predetermined range is not limited. The shape of the predetermined range may be any of a polygon, a circle/ellipse, and a shape having an irregular outer edge. The scheme of defining the size of the predetermined range is not limited, but the predetermined range is set as a common-sense range so that a user (person) can access the predetermined point on foot. For example, in the case of a rectangular predetermined range, the size of the predetermined range may be 1 km square. By preliminarily defining the predetermined range, it is possible to reduce the load of a process of specifying a user. The position of a predetermined point of interesting (POI) may be employed as a reference point.

Figure 4B:
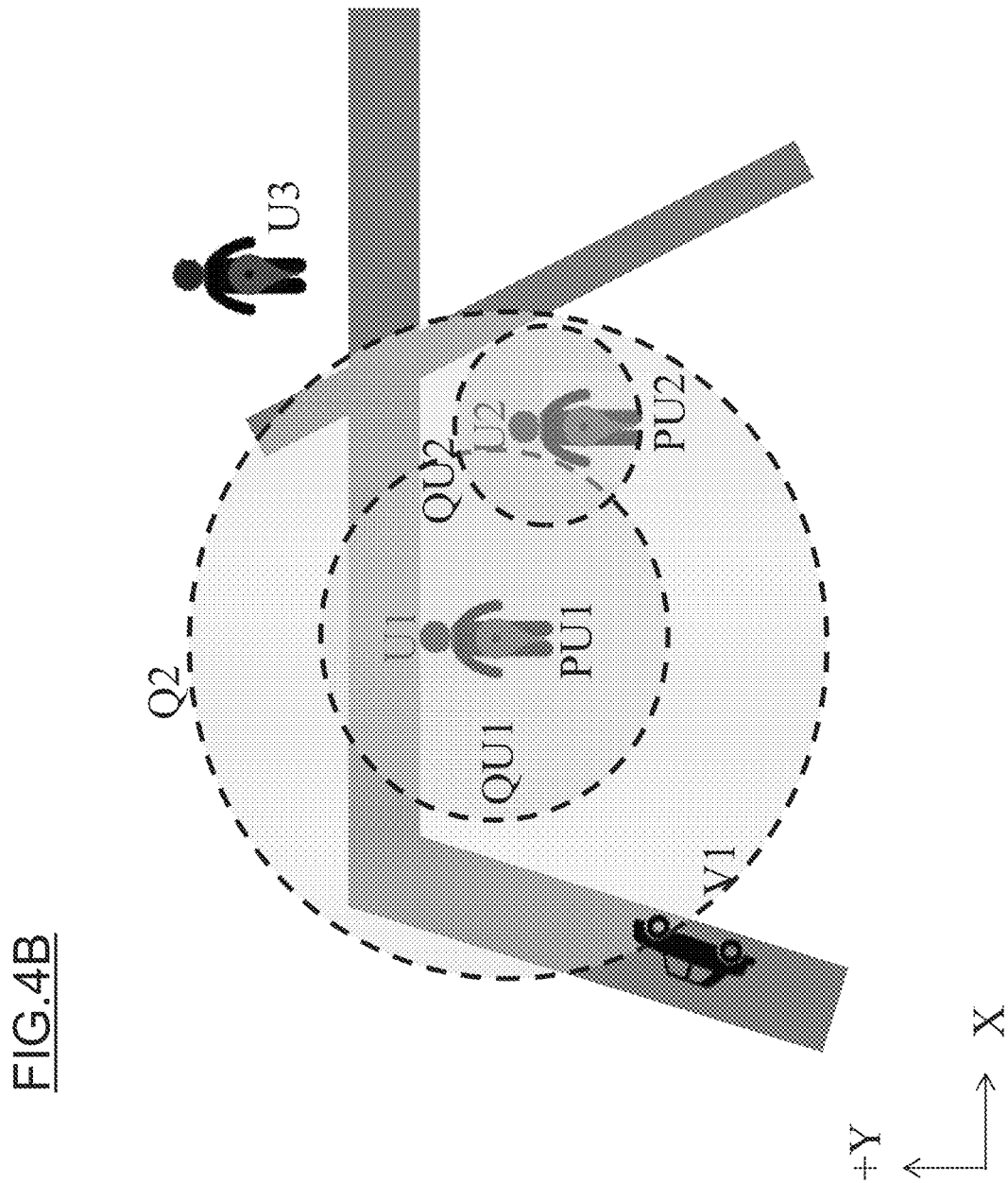
FIG. 4B is a diagram illustrating a second example of a scheme of setting a predetermined range in one or more embodiments of the present invention.

As illustrated in FIG. 4B, a predetermined range Q2 (illustrated by a broken line) may be defined using a request point or the like as the reference point. For example, the predetermined range Q2 corresponding to a user U1 who made a vehicle allocation request may be set with reference to a request point PU1 of the user U1. The predetermined range Q2 may also be set as an area that includes a user range QU1 based on the request point PU1 of the user U1. For example, the predetermined range Q2 may be set so as to include request points PU1 and PU2 (departure points such as the current location and the boarding point) of a plurality of users U1 and U2 who made the vehicle allocation requests. In the example illustrated in the figure, the predetermined range Q2 is set as a circular area having a constant radius, for example, 500 m, around the request point PU1 of the user U1 who made the vehicle allocation request.

The request point of a user as a reference when setting the predetermined range Q2 may be the request point of a user from whom a vehicle allocation request is newly acquired or may also be the request point of the user for whom execution of the request (vehicle allocation request) has already been performed. The range in which walking is possible is set using information on the route which is included in the map information 123 and along which walking is possible. The predetermined range Q2 may be set as a range that can be reached within a predetermined time (e.g., within 5 minutes) from the request point (departure point) of the user U1 or may also be set as an area including the user range QU1 that can be reached on foot within 3 minutes. By setting the predetermined range Q2 so as to include the request points, it is possible to create the vehicle allocation plan in which the predetermined points are set, including the boarding points/alighting points along the desires of users.

In a process of setting the predetermined range Q2 on the basis of the request points, user ranges QU1 and QU2 may be set in accordance with the request points of respective users, and the predetermined range Q2 may be set to include the user ranges QU1 and QU2. When the predetermined range Q2 is set from the user ranges QU1 and QU2 based on the request points, the attribute of each user included in the request is taken into account. That is, the user ranges QU1 and QU2 are set on the basis of the attributes of the users. When the attribute of the user U2 is being an elderly person, a child, or a person with a child, carrying a large/heavy baggage, or having a handicap such as an injury, the size (diameter) of the user range QU2 is set small. On the other hand, when the attribute of the user U1 is not being an elderly person, a child, or a person with a child, carrying a small/light baggage, or having no handicap such as an injury, the size (diameter) of the user range QU1 is set relatively large. By taking into account the attributes of users when setting a predetermined range Q, it is possible to create the vehicle allocation plan in which the predetermined points are set, including the boarding points/alighting points determined to give importance to the convenience of the users.

In step 104, the processor 10 specifies a user who is expected to board at a point included in the predetermined range. The processor 10 narrows down users who board the vehicle or alight from the vehicle within the predetermined range as the targets and attempts to make a vehicle allocation plan in which the narrowed-down users are allowed to board/alight. Points included in the predetermined range include a request point and a common point. When the predetermined range is set on the basis of a request point, users are specified on the basis of one or more request points. By specifying the users on the basis of the request points, it is possible to create the vehicle allocation plan in which the predetermined points are set, including the boarding points/ alighting points along the desires of users. Users targeted for the vehicle allocation plan are not limited to the users who board/alight within the predetermined range, and all the users who transmitted requests may be targeted.

In step 105, the processor 10 calculates a common point at which a specified user boards as the predetermined point. A single common point may be calculated or a plurality of common points may also be calculated.

The processor 10 may calculate a common point that is a point at which one user of specified users boards. The common point in this case is a predetermined point at which the vehicle and the one user get together. The processor 10 may calculate a common point that is a point at which a plurality of users of specified users boards. The common point in this case is a predetermined point at which the vehicle and the plurality of users get together. The plurality of users is allowed to board at one common point; therefore, the number of stops can be reduced, and one trip time can be shortened when compared on the same route. By reducing the number of stops, it is possible to suppress the energy consumption, improve the fuel efficiency of the vehicle, and reduce the time required for passing from the first predetermined point to the last predetermined point in the vehicle allocation service.

Schemes of calculating a common point will then be described with reference to FIGS. 5A to 5D.

<First Scheme>

The processor 10 calculates the common point on the basis of the request point included in the request from a user. The common point may be the center or weighted center of an area that includes the request points of a plurality of users. When there is a place in which an evacuation area or the like is set in an area including the request points of a plurality of users (a place in which it is easy for the vehicle to park), the place is set as the common point. By calculating the common point on the basis of the request points, it is possible to create the vehicle allocation plan in which the common point is set along the desires of users.

<Second Scheme>

Figure 5A:
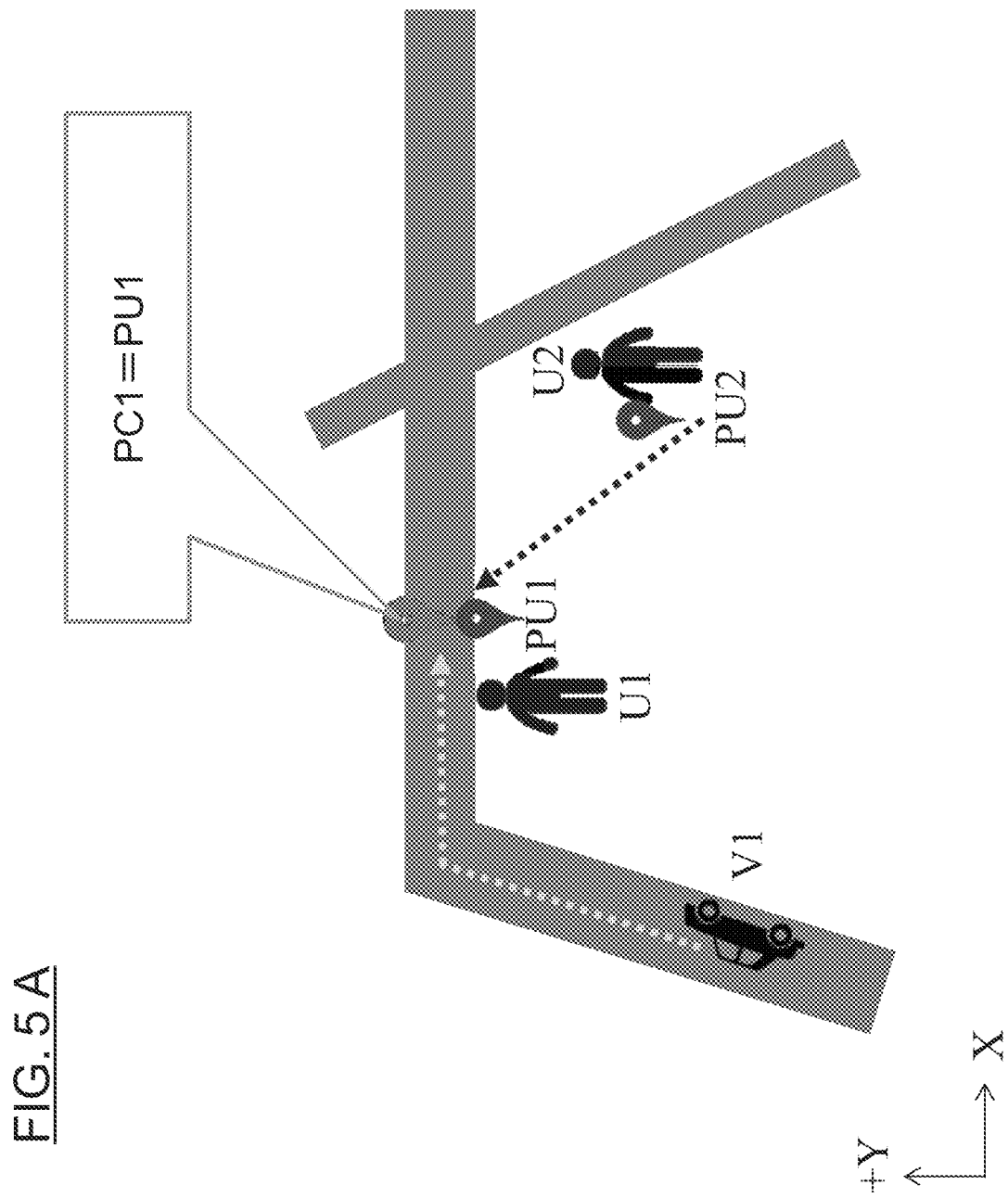
FIG. 5A is a diagram illustrating a first example of a scheme of calculating a common point for boarding.

As illustrated in FIG. 5A, the common point PC1 may be a request point PU1 related to a request of one user U1 from among a plurality of users. When the execution of the request for allocation is already determined, the request point PU1 may be set as the common point PC1. The request point PU1 of the user U1 who requests the allocation first among the plurality of users U1 and U2 is defined as a common point PC1. Although not illustrated, the request point PU2 indicated by the request of the user U2 who has recently (later) requested among the multiple users U1 and U2 may be set as the common point. When there is one user, that is, when there is one request point, a point near the request point is set as the common point. By setting the request point of a user as the common point, it is possible to create the vehicle allocation plan in which the common point is set along the desire of the user. Additionally or alternatively, when there is a place in which it is easy for the vehicle to park, such as a place in which an evacuation area or the like is set near the request point, the point of the place is set as the common point.

The common point may be calculated as a point at which a plurality of users of specified users boards. The common point in this case is a predetermined point at which the plurality of users and the vehicle gets together. The plurality of users is allowed to board at one common point; therefore, the number of stops can be reduced, and one trip time can be shortened. By reducing the number of stops, it is possible to suppress the energy consumption, improve the fuel efficiency of the vehicle, and reduce the time required for passing from the first predetermined point to the last predetermined point in the vehicle allocation service. The same effects can be obtained also in the third to fifth schemes.

<Third Scheme>

The processor 10 sets the common point to a point for which a determination is made that the access cost for a vehicle and the access cost for a user are equivalent. The access cost for a vehicle in this scheme is a cost calculated from the time required for the vehicle to reach an arbitrary point (common point). Arbitrary points include the common point. The access cost for a user is a cost calculated from the time required for the user to reach an arbitrary point (common point). Arbitrary points include the common point.

For an arbitrary point, the processor 10 calculates the access cost for a vehicle and the access cost for a user. The access cost regarding the arrival time of a vehicle is determined through referring to the map information 123 to calculate the distance to an arbitrary point (common point) that is set for calculation, acquiring the vehicle speed of the vehicle from the vehicle speed sensor 62, and calculating the time required for arrival at the arbitrary point or the time of arrival at the arbitrary point. The vehicle speed may be a legal speed or a standard speed for each road stored in association with the road information 122. The required time may be calculated with reference to traffic congestion information.

The distance for a user to reach an arbitrary point (common point) on foot may be determined by taking into account not only the length of a road in the map information 123 but also a specific position at which the user is located, such as the floor of a facility or the position in the facility. In a large facility, the distance (required time) to an exit is required depending on the position of the user and the floor number and may affect the distance (required time) to a predetermined point. The processor 10 calculates the floor number of the user and the distance to an exit of the facility using the altitude and position detected by the position detection device 340 of the user terminal apparatus 300 and adds the result to the access cost for the user. The map information 123 possesses not only the location of a facility but also floor maps of the facility. The processor refers to the map information 123 to calculate the distance from the current location of the user to an exit of the facility.

The access cost regarding the arrival time of a user is determined through referring to the map information 123 to calculate the distance from the current location to an arbitrary point (common point), reading the walking speed of a general pedestrian, which is preliminarily stored, and calculating the time until the user arrives at the arbitrary point or the time at which the user arrives at the arbitrary point. The access cost regarding the arrival time of a user may be affected by the attribute of the user. The processor 10 may calculate the access cost by setting the walking speed to be lower as the age of the user is a predetermined value (old age) or more and the age is higher. The processor 10 may also calculate the access cost by setting the walking speed to be lower as the age of the user is less than a predetermined value (child) and the age is lower. When the user carries a large baggage such as a suitcase, the processor 10 may calculate the access cost by setting the walking speed to be lower than when the user does not carry such a baggage.

The processor 10 sequentially sets an arbitrary point on the route as a provisional common point, obtains the route for a vehicle and the route for a user to the provisional common point, and calculates the time required for the vehicle to reach the common point along the route and the time required for the user to reach the common point along the route. A provisional common point having the smallest arrival time difference at the provisional common point is obtained as the common point to which the access cost for the vehicle and the access cost for the user are equivalent. It is preferred to preliminarily register provisional common points in the map information 123. The provisional common points to be preliminarily set may be set by selecting points to which the access difficulty level, which represents the difficulty for the vehicle to make a stop, is less than a predetermined value (access cost is low).

The processor 10 compares the access cost for the vehicle with the access cost for the user. The processor 10 calculates, as the common point, an arbitrary point for which a determination is made that the access cost for the vehicle calculated from the time to the common point and the access cost for the user calculated from the time to the common point are equivalent, that is, an arbitrary point for which a determination is made that the arrival time difference at the common point is less than a predetermined value. This common point is the predetermined point to which the target vehicle to be allocated moves.

Figure 5B:
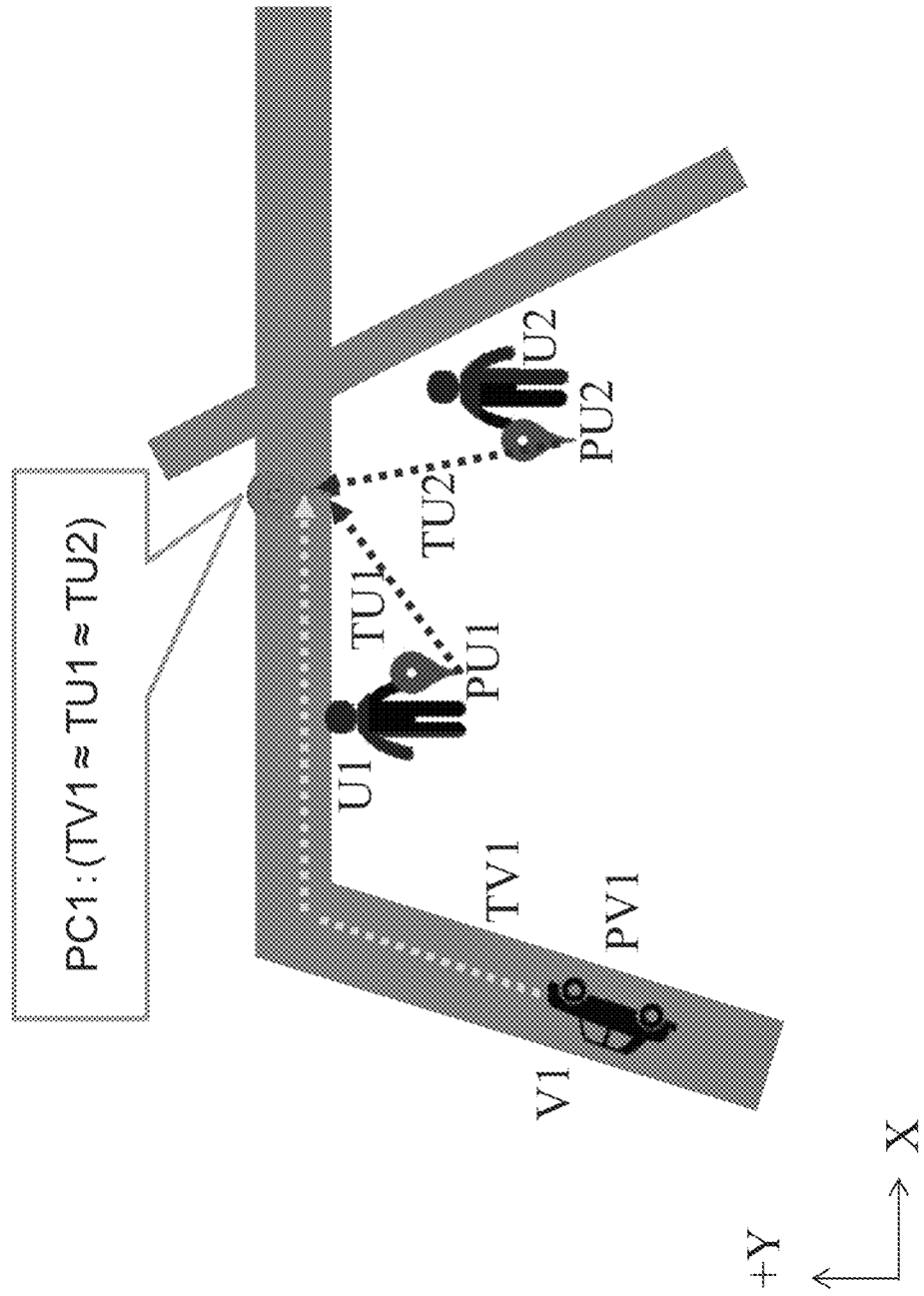
FIG. 5B is a diagram illustrating a second example of a scheme of calculating a common point for boarding.

As illustrated in FIG. 5B, a common point PC1 is calculated as the position at which a time TV1 for a vehicle V1 to reach the common point PC1, a time TU1 for a user U1 to reach the common point PC1, and a time TU2 for a user U2 to reach the common point PC1 are substantially equal. With reference to the calculated time under the condition that the time TV1, the time TU1, and time TU2 are substantially equal, the vehicle V1 moving, the user U1 moving, and the user U2 moving arrive at the common point PC1 at approximately the same time. That is, this can prevent the vehicle V1 from staying for a long time to wait for the users U1 and U2. By shortening the staying time of the vehicle V1 to be allocated, it is possible to suppress the disturbance of the traffic flow due to the allocated vehicle being parked.

As illustrated in FIG. 5B, the common point PC1 specified as a point where the vehicle V1 and the two users U1 and U2 arrive at the same time is shown. In some cases, however, such the common point cannot be calculated. When it is not possible to calculate the common point PC1 at which the vehicle V1 and two of users U1 and U2 arrive at the same time, the common point PC1 may be calculated so that the arrival time TV1 of the vehicle V1 is substantially the same as the arrival time TU2 of the user U2 whose position is separated from the vehicle V1. If the common point is set as a point at which the vehicle V1 and the user U1 closer to the vehicle V1 arrive at the same time, the vehicle V1 has to wait for the arrival of the user U2, who is located at a position relatively far from the vehicle, after picking the user U1 up. In such a case, the common point PC1 is set as a point at which the vehicle V1 arrives at the same time as the user U2 located at a position relatively far from the vehicle. The user U1 located closer to the vehicle is made to wait, but the staying time of the vehicle V1 can be minimized and it is therefore possible to suppress the disturbance of the traffic flow due to the allocated vehicle being parked.

<Fourth Scheme>

The processor 10 sets the common point to a point for which a determination is made that the access costs for a plurality of users are equivalent. The access cost for a user in this scheme is a cost calculated from the distance for the user to reach an arbitrary point (common point), the time for the user to reach the arbitrary point (common point), or the load for the user to reach the arbitrary point (common point). Arbitrary points include the common point.

For an arbitrary point, the processor 10 calculates the access costs for a plurality of users. The access cost regarding the arrival time of a user is determined by referring to the map information 123 to calculate the distance to an arbitrary point (common point). When the user is located in a large facility, as in the third scheme, the processor 10 refers to facility information in the map information 123, calculates the floor number of the user and the distance to an exit of the facility using the altitude and position detected by the position detection device 340 of the user terminal apparatus 300, and adds the calculated distance to the distance from the exit of the facility to an arbitrary point (common point) to calculate the distance for the user to reach the arbitrary point (common point). On the basis of the calculated distance, the processor 10 reads the walking speed of a general pedestrian, which is preliminarily stored, and calculates the time until the user arrives at the arbitrary point or the time at which the user arrives at the arbitrary point. The access cost regarding the arrival time of a user may be affected by the attribute of the user; therefore, as described in the third scheme, the walking speed may be set in accordance with the age and/or the load of a baggage. The processor 10 sequentially sets an arbitrary point on the route as a provisional common point, obtains the route for each user to the provisional common point, and calculates the time required for the user to reach the common point along the route. Schemes described in the above third scheme can be borrowed herein for the scheme of calculating the access cost.

The access cost regarding the load can be set in accordance with the position of a user and the attribute of the user. The access cost regarding the load may be added to the access cost regarding the distance or time or may also be used as a weighting coefficient for the access cost regarding the distance or time. When there is an altitude difference of a predetermined value or more along the route from the current location of the user to an arbitrary point (common point), the access cost regarding the load is calculated high. For example, when the user has to cross the overpass of a grade separation to move from the current location of the user to an arbitrary point (common point), the access cost is calculated high. This is because the up-and-down load on the overpass stairs is taken into account. When there is a slope along the route from the current location of the user to an arbitrary point (common point) and the user goes up the slope, the access cost is calculated higher than when going down the slope. This is because the load of going up the slope is taken into account. The slope of a route can be acquired from the road information 122. When the user has to cross a pedestrian crosswalk along the route from the current location of the user to an arbitrary point (common point), the access cost is calculated high. This is because the load of moving to the opposite lane is taken into account. When the user is in a large facility, the access cost is calculated high. This is because the load of moving to an exit of the facility is taken into account.

When a user carries a large baggage in the attribute of the user obtained with the request, the access cost is calculated high. This is because the load of carrying the baggage is taken into account. When the age of a user is a predetermined value (old age) or more in the attribute of the user obtained with the request, the higher the age, the higher the access cost is calculated, while when the age is less than a predetermined value (child), the lower the age, the higher the access cost is calculated. When the distance or time accepted for movement is less than a predetermined value in the requirement from a user obtained with the request, the access cost is calculated higher than otherwise. This is because individual differences in the acceptance for movement are taken into account.

The calculation result of the access cost regarding the load may be used as a weighting coefficient for calculating the access cost regarding the distance/time. The coefficient can be set such that the access cost regarding the distance/time is a higher value as the value of the access cost regarding the load increases.

The processor 10 sequentially sets an arbitrary point on the route as a provisional common point, obtains respective routes for a plurality of users to the provisional common point, and calculates the time required for each user to reach the common point along the route for the user. A provisional common point having the smallest arrival time difference at the provisional common point is obtained as the common point to which the access costs for the users are equivalent.

It is preferred to preliminarily register provisional common points in the map information 123. The provisional common points to be preliminarily set may be set by selecting points to which the access difficulty level, which represents the difficulty for the vehicle to make a stop, is less than a predetermined value (access cost is low).

The processor 10 compares the access cost for a first user with the access cost for a second user different from the first user. The processor 10 calculates, as the common point, an arbitrary point for which a determination is made that the access costs regarding the time/distance/load to the common point are equivalent, that is, an arbitrary point for which a determination is made that the difference between the arrival time/distance/load for the first user to reach the common point and the arrival time/distance/load for the second user to reach the common point is less than a predetermined value or minimized. This common point is the predetermined point to which the target vehicle to be allocated moves. Here, the first user and the second user are described, but also for three or more users, the common point is calculated as an arbitrary point for which a determination is made that the difference between the arrival time/distance/load for a user to reach the common point and the arrival time/distance/load for another user to reach the common point is less than a predetermined value.

As illustrated in FIG. 5C, a common point PC1 is calculated as the position at which a distance DU1 (time TU1) for a user U1 to reach the common point PC1 is substantially equal to a distance DU2 (time TU2) for a user U2 to reach the common point PC1. Under the condition that the distance DU1 (time TU1) and the distance DU2 (time TU2) are substantially equal, the user U1 moving to the common point PC1 and the user U2 moving to the common point PC1 undertake similar access costs (walking distances, walking time, loads such as going up and down). This allows the vehicle to be allocated so that a plurality of users shares the same level of access cost, and the reliability of the system for the users can be enhanced. As the users come together at the common point at the same time, the vehicle can therefore adjust its speed and/or route thereby to obtain the appropriate timing for the users to board. As a result, by shortening the staying time of the vehicle V1 to be allocated, it is possible to suppress the disturbance of the traffic flow due to the allocated vehicle being parked.

<Fifth Scheme>

The processor 10 calculates the access cost for a vehicle from an access difficulty level for the vehicle to reach the common point and calculates, as the common point, a point to which the access cost for the vehicle is lower than a predetermined value.

For each of arbitrary points, the processor 10 calculates the access difficulty level for a vehicle. The access difficulty level for a vehicle is determined, for example, using the access time or access distance to an arbitrary point (common point), the allowed staying time at an arbitrary point (common point), the presence or absence of a traffic signal (or the number of traffic signals) on the route to an arbitrary point (common point), and/or the necessity of a U-turn on the route to an arbitrary point (common point). The access cost is calculated as a higher value as the value of the access time or access distance for a vehicle to reach an arbitrary point (common point) increases. The access cost is calculated as a higher value as the allowed staying time at an arbitrary point (common point) decreases. The allowed staying time may be set in accordance with the traffic volume. As the traffic volume at an arbitrary point (common point) increases, the allowed staying time decreases, and the access cost is therefore calculated as a higher value. When there is a traffic signal on the route to an arbitrary point (common point), the access cost is calculated as a higher value than when there is no traffic signal. The access cost is calculated as a higher value as the number of traffic signals on the route to an arbitrary point (common point) increases. When a U-turn is required on the route to an arbitrary point (common point), the access cost is calculated to a higher value than when no U-turn is required.

The processor 10 compares the access cost to each arbitrary point (common point) with a set threshold. The processor 10 calculates, as the common point, an arbitrary point to which the access cost is a lower value than a predetermined value. This common point is the predetermined point to which the allocated vehicle moves.

Figure 5D:
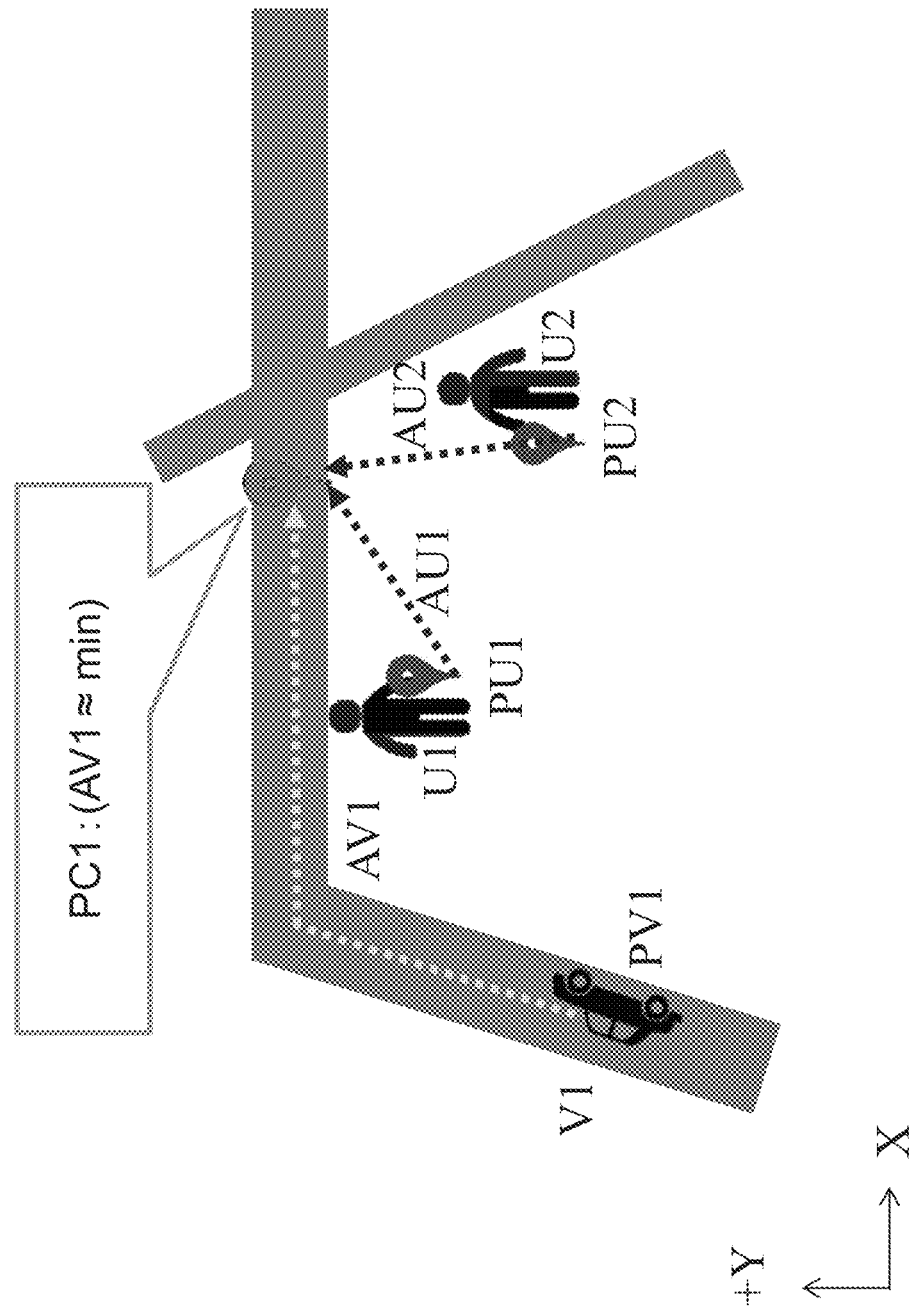
FIG. 5D is a diagram illustrating a fourth example of a scheme of calculating a common point for boarding.

As illustrated in FIG. 5D, the processor 10 calculates a point to which an access cost AV1 is a lower value than a predetermined value as a common point PC1. The route search process may include preliminarily calculating the access cost AV1 to each arbitrary point (common point) and storing the calculated access cost AV1 as a part of the map information 123. This allows the point with a low access cost for the vehicle to be selected as the common point, and it is possible to ensure that the vehicle is controlled to make a stop at the common point and the user is allowed to board at the common point.

Referring again to FIG. 3, in step 106, the processor 10 presents the calculated common point to each user using the user terminal apparatus 300. A single common point may be presented or a plurality of common points may also be presented. In step 107, the processor 10 makes an inquiry to the user about the user's acceptance of the common point via the user terminal apparatus 300. The processor 10 controls the user terminal apparatus 300 to output a message for confirming the user's intention, such as «Do you accept boarding at the common point?», or «Do you fix the reservation?». The user terminal apparatus 300 receives the input of an acceptance instruction for the common point. The acceptance instruction includes an input command for selecting one common point from among a plurality of common points. In this case, the processor 10 controls the user terminal apparatus 300 to output a message for confirming the user's selection intention and usage intention, such as «There is a plurality of boarding point candidates. Please specify the boarding point».

In step 107, the processor 10 confirms the user's acceptance. When the user's acceptance is not obtained, the process proceeds to step 112, in which the request for boarding is canceled. When the user's acceptance is obtained, the process proceeds to step 108, in which one accepted common point is set as the predetermined point. The predetermined point is a point to which the allocated vehicle is controlled to move and at which the user is allowed to board or alight. Thus, each predetermined point to which the vehicle is controlled to move is calculated after confirming the user's acceptance, and the user can therefore board at a point that matches the user's intention.

In step 109, the processor 10 controls the navigation device 120 to calculate a route for sequentially following the predetermined points. The processor 10 creates a vehicle allocation plan in accordance with the calculated route. The processor 10 selects a vehicle closest to the start point of the route (predetermined point to be followed first) as the target vehicle to be allocated.

In step 110, the processor 10 transmits, to the vehicle controller 70 of the target vehicle, the created vehicle allocation plan and an instruction for the target vehicle to autonomously move along the vehicle allocation plan. The vehicle allocation plan includes the predetermined points at which the vehicle picks up/drops off the users and the route for following the predetermined points. The vehicle controller 70 executes the above-described autonomous travel control on the basis of the vehicle allocation plan and controls the vehicle to move along the route.

On the basis of the vehicle allocation plan, the vehicle controller 70 controls the vehicle to make stops at the predetermined points (including the common point and one or more request points) located along the route and opens the door for boarding/alighting. After the door is opened, the door is closed when a predetermined time has elapsed. The processor 10 controls the vehicle controller to confirm that the vehicle has stopped. Execution of boarding or alighting is confirmed on the basis of the detection results from a door lock sensor (not illustrated), a seating sensor (not illustrated), and a seat belt sensor (not illustrated) included in the sensor 60 and images captured by a vehicle interior camera (not illustrated) included in the detection device 50. After the users' boarding or alighting included in the vehicle allocation plan is completed, the vehicle is controlled to move to the next predetermined point. The processor 10 creates a vehicle allocation plan for another target vehicle and transmits an instruction for the target vehicle to autonomously move along the vehicle allocation plan to the vehicle controller 70 of the target vehicle.

In this example, the boarding point determination apparatus 100 operates to control the creation/execution of the vehicle allocation plan. The creation/execution of the vehicle allocation plan may be executed by a processor (not illustrated) provided separately in the vehicle allocation system 1.

The boarding point determination apparatus 100 according to one or more embodiments of the present invention is configured and operates as the above and therefore has the following effects.

(1) The boarding point determination method according to one or more embodiments of the present invention includes specifying a second user who is expected to board in a predetermined range including a point associated with a first user and calculating, as the predetermined point, a common point at which users including at least the first user and the second user board, and it is therefore possible to prevent a vehicle from making frequent stops and suppress an increase in the trip time while responding to the request from each user who desires the use of the vehicle allocation system. By reducing the number of stops, it is possible to suppress the energy consumption, improve the fuel efficiency of the vehicle, and reduce the time required for passing from the first predetermined point to the last predetermined point in the vehicle allocation service.

According to the boarding point determination method in one or more embodiments of the present invention, one vehicle is used by a plurality of users and it is therefore possible to prevent the vehicle from making frequent stops and suppress an increase in the trip time. By reducing the number of stops, it is possible to suppress the energy consumption, improve the fuel efficiency of the vehicle, and reduce the time required for passing from the first predetermined point to the last predetermined point in the vehicle allocation service. Moreover, the usage efficiency of the vehicle can be improved.

According to the boarding point determination method in one or more embodiments of the present invention, the processor operates to calculate the common point that is a point at which a plurality of users of specified users boars.

The common point is a predetermined point at which the vehicle and one or more users get on together. The plurality of users is allowed to board at one common point; therefore, the number of stops can be reduced, and one trip time (the time required for passing from the first predetermined point to the last predetermined point in the vehicle allocation service) can be shortened. By reducing the number of stops, it can be expected to suppress the energy consumption and improve the fuel efficiency of the vehicle.

(2) According to the boarding point determination method in one or more embodiments of the present invention, users are specified on the basis of one or more request points and it is therefore possible to calculate the predetermined points including the boarding points along the desires of users. The users who share a ride on a vehicle can be preliminarily specified; therefore, unnecessary information is not given to unrelated users and the system load can be reduced.

(3) According to the boarding point determination method in one or more embodiments of the present invention, by calculating the common point on the basis of the request point, it is possible to calculate the common point along the desire of a user. The common point is calculated on the basis of the request point of a user, and a reasonable common point can therefore be calculated with consideration for the distance from the user. When there is a plurality of specified users, a common point reasonable for the plurality of users can be calculated on the basis of the request points of the plurality of users. When there is one specified user, a common point reasonable for the user and a vehicle to be allocated can be calculated on the basis of the request point of the user.

(4) According to the boarding point determination method in one or more embodiments of the present invention, by calculating/determining the request point of a user as the common point, it is possible to calculate the common point along the desire of the user. A request point may be set as the common point. Among the request points of a plurality of users, one request point of a user or request points of a plurality of users may be set as the common point, and the number of users moving to the common point can therefore be minimized. The process of calculating the common point is not required, and the system load can therefore be reduced. When there is one specified user, a common point reasonable for the user and a vehicle to be allocated can be obtained without a calculation load because the request point of the user is set as the common point.

(5) According to the boarding point determination method in one or more embodiments of the present invention, the request point is set as the boarding point desired by a user or the current location of a user, so the common point can thereby be calculated as a point that is convenient for a user who desires boarding. When the request point is set as the current location, the current location is automatically collected, and the user's input work can therefore be omitted. By receiving the input of a boarding point desired by a user, it is possible to request the vehicle allocation even at a location at which the current location cannot be detected or a location at which the detection accuracy for the current location is poor.

(6) According to the boarding point determination method in one or more embodiments of the present invention, the cost calculated from the time for a user to reach the common point is calculated as the access cost for the user, the cost calculated from the time for a vehicle to reach the common point is calculated as the access cost for the vehicle, and a point for which a determination is made that the access cost for the vehicle and the access cost for the user are equivalent is calculated as the common point.

This can prevent the vehicle V1 from staying for a long time to wait for the users U1 and U2. By shortening the staying time of the vehicle V1 to be allocated, it is possible to suppress the disturbance of the traffic flow due to the allocated vehicle being parked. The waiting time for each of the user and the vehicle can be minimized because the common point is set as a point at which the difference between the arrival time of the user and the arrival time of the vehicle is small (or a point at which the user and the vehicle arrive at the same time).

(7) According to the boarding point determination method in one or more embodiments of the present invention, the cost calculated from any one of the time for a user to reach the common point, the distance for the user to reach the common point, and the load for the user to reach the common point, is calculated as the access cost for the user, and a point for which a determination is made that the access cost for a first user and the access cost for a second user are equivalent is calculated as the common point.

This allows the vehicle to be allocated so that a plurality of users shares the same level of access cost, and the reliability of the system for the users can thus be enhanced. The users gather at the common point at the same time and the vehicle can therefore adjust its speed and/or route thereby to obtain the appropriate timing for the users to board. As a result, by shortening the staying time of the vehicle V1 to be allocated, it is possible to suppress the disturbance of the traffic flow due to the allocated vehicle being parked. The waiting time for each of the users can be minimized because the common point is set as a point at which the difference between the arrival time of a user and the arrival time of another user is small (or a point at which a user and another user arrive at the same time).

(8) According to the boarding point determination method in one or more embodiments of the present invention, the access cost for a vehicle is calculated from the access difficulty level for the vehicle to reach the common point, and a point to which the access cost for the vehicle is a lower value than a predetermined value is calculated as the common point. It is therefore possible to ensure that the vehicle is controlled to make a stop at the common point and a user is allowed to board at the common point.

(9) According to the boarding point determination method in one or more embodiments of the present invention, the predetermined range is set as an area that is preliminarily set, and the load of the calculation process for specifying a user can therefore be reduced.

(10) According to the boarding point determination method in one or more embodiments of the present invention, by determining the predetermined range so as to include the request points, users can be narrowed down to those located in the vicinity of respective request points (current locations, desired boarding locations), and the predetermined points can therefore be set to include the boarding points along the desires of users. The predetermined range is determined in accordance with the users' request points which change from moment to moment, and the predetermined range can therefore be set in accordance with the current situation to specify the users.

(11) According to the boarding point determination method in one or more embodiments of the present invention, the predetermined range is set on the basis of attributes of users who made requests, and the predetermined points can be set, including the boarding points determined to give importance to the convenience of the users.

(12) According to the boarding point determination method in one or more embodiments of the present invention, an inquiry is made to a user about an acceptance of the common point, and the common point is set as the predetermined position when the acceptance is obtained from the user; therefore, the user is allowed to board at the point which matches the user's intention.

(13) According to the boarding point determination method in one or more embodiments of the present invention, the vehicle has an autonomous travel function. By calculating the common point, it is possible to reduce the number of points at which the autonomously traveling vehicle makes stops to allow the users to board, thus reducing the trip time. The autonomous traveling is performed on the basis of the vehicle allocation plan in which the predetermined points are defined to allow the users to board, and human errors do not occur, such as the vehicle passing through the predetermined point without noticing the stop point.

(14) The boarding point determination apparatus 100 according to one or more embodiments of the present invention has similar actions and effects to those obtained by the above-described boarding point determination method.

Embodiments heretofore explained are described to facilitate understanding of the present invention and are not described to limit the present invention. It is therefore intended that the elements disclosed in the above embodiments include all design changes and equivalents to fall within the technical scope of the present invention.

| [Description of Reference Numerals] | | | |
|---|---|---|---|
| 1 | Vehicle allocation system | | |
| 100 | Boarding point determination apparatus | | |
| | 10 | Processor | |
| | | 11 | CPU |
| | | 12 | ROM |
| | | 13 | RAM |
| | 20 | Communication device | |
| | 30 | Output device | |
| 200 | Control device, onboard apparatus | | |
| | 40 | Communication device | |
| | 50 | Detection device | |
| | | 51 | Camera |
| | | 52 | Radar device |
| | | 53 | Vehicle diagnosis device |
| | 60 | Sensor | |
| | | 61 | Steering angle sensor |
| | | 62 | Vehicle speed sensor |
| | 70 | Vehicle controller | |
| | | 71 | Processor |
| | 80 | Driving device | |
| | | 81 | Braking device |
| | 90 | Steering device | |
| | 110 | Output device | |
| | | 111 | Display |
| | | 112 | Speaker |
| | 120 | Navigation device | |
| | | 121 | Position detection device |
| | | 122 | Road information |
| | | 123 | Map information |
| 300 | User terminal apparatus | | |
| | 310 | Processor | |
| | | 311 | CPU |
| | | 312 | ROM |
| | | 313 | RAM |
| | 320 | Communication device | |
| | 330 | Input/output device | |
| | | 331 | (Touch panel-type) display |
| | | 332 | Speaker |
| | 340 | Position detection device | |

The invention claimed is:

1. A boarding point determination method used in a vehicle allocation system configured to move a vehicle to a predetermined point in response to a request from a user, the boarding point determination method operated by a processor comprising:
setting a predetermined range including a point associated with a first user;
specifying a second user who is expected to board in the predetermined range and is different from the first user;
calculating as the predetermined point a common point at which users including the first user and the second user board;
generating a route for the vehicle from a current location of the vehicle obtained by a GPS device to the common point; and
controlling, by a vehicle controller, the vehicle to move along the route,
wherein the calculating a common point comprises:
calculating a cost calculated from any one or more of a time for the first user to reach the common point, a distance for the first user to reach the common point, and a load for the first user to reach the common point as an access cost for the first user;
calculating a cost calculated from any one or more of a time for the second user to reach the common point, a distance for the second user to reach the common point, and a load for the second user to reach the common point as an access cost for the second user;
comparing the access cost for the first user with the access cost for the second user different from the first user; and
calculating as the common point a point for which a determination is made that the access cost for the first user and the access cost for the second user are equivalent and at which the first user and the second user are to board the vehicle.

2. The boarding point determination method according to claim 1, wherein the request includes a request point of the user, the boarding point determination method further comprising:
specifying the users on the basis of one or more the request points.

3. The boarding point determination method according to claim 1, wherein the request includes a request point of the user, the calculating a common point further comprising:
calculating the common point on a basis of the request point.

4. The boarding point determination method according to claim 1, wherein the request includes a request point of the user, the boarding point determination method further comprising:
setting the request point of a user as the common point.

5. The boarding point determination method according to claim 3, wherein
the request point is a boarding point desired by the user, or a current location of the user.

6. The boarding point determination method according to claim 1, wherein the calculating a common point further comprises:
calculating an access cost for the vehicle from an access difficulty level for the vehicle to reach the common point; and
calculating as the common point a point to which the access cost for the vehicle is a lower value than a predetermined value.

7. The boarding point determination method according to claim 1, wherein the predetermined range is an area that is preliminarily set.

8. The boarding point determination method according to claim 1, wherein the request includes a request point of the user, the setting a predetermined range comprises:
   determining the predetermined range so as to include the request point.

9. The boarding point determination method according to claim 1, wherein the setting a predetermined range is on a basis of an attribute of the user who made the request.

10. The boarding point determination method according to claim 1, wherein the boarding point determination method further comprises:
    notifying the user of the common point;
    making an inquiry to the user about an acceptance of the common point; and
    setting the common point as the predetermined position when the acceptance is obtained from the user.

11. The boarding point determination method according to claim 1, wherein the vehicle has an autonomous travel function.

12. The boarding point determination method according to claim 1, wherein when a distance or time accepted for movement is less than a predetermined value in the request from one of the first user and the second user, the access cost is calculated higher for the one of the first user and the second user.

13. A boarding point determination method used in a vehicle allocation system configured to move a vehicle to a predetermined point in response to a request from a user, the boarding point determination method operated by a processor comprising:
    setting a predetermined range including a point associated with a first user;
    specifying a second user who is expected to board in the predetermined range and is different from the first user; and
    calculating as the predetermined point a common point at which users including the first user and the second user board;
    generating a route for the vehicle from a current location of the vehicle obtained by a GPS device to the common point; and
    controlling, by a vehicle controller, the vehicle to move along the route,
    wherein the calculating a common point comprises:
       calculating a cost calculated from a time for the first user to reach the common point as an access cost for the first user;
       calculating a cost calculated from a time for the second user to reach the common point as an access cost for the second user;
       calculating a cost calculated from a time for the vehicle to reach the common point as an access cost for the vehicle;
       comparing the access cost for the vehicle with the access cost for the first user and the access cost for the second user; and
       calculating as the common point a point for which a determination is made that the access cost for the vehicle, the access cost for the first user, and the access cost for the second user are equivalent and at which the first user and the second user are to board the vehicle.

14. The boarding point determination method according to claim 13, wherein
    the request includes a request point of the user, and
    the processor operates to specify the users on the basis of one or more the request points.

15. The boarding point determination method according to claim 13, wherein
    the request includes a request point of the user, and
    the processor operates to calculate the common point on a basis of the request point.

16. The boarding point determination method according to claim 13, wherein
    the request includes a request point of the user, and
    the processor operates to set the request point of a user as the common point.

17. The boarding point determination method according to claim 15, wherein
    the request point is a boarding point desired by the user, or a current location of the user.

18. The boarding point determination method according to claim 13, wherein the processor operates to:
    calculate an access cost for the vehicle from an access difficulty level for the vehicle to reach the common point; and
    calculate as the common point a point to which the access cost for the vehicle is a lower value than a predetermined value.

19. The boarding point determination method according to claim 13, wherein the predetermined range is an area that is preliminarily set.

20. The boarding point determination method according to claim 13, wherein
    the request includes a request point of the user, and
    the processor operates to determine the predetermined range so as to include the request point.

21. The boarding point determination method according to claim 13, wherein
    the processor operates to set the predetermined range on a basis of an attribute of the user who made the request.

22. The boarding point determination method according to claim 13, wherein the processor operates to:
    notify the user of the common point;
    make an inquiry to the user about an acceptance of the common point; and
    set the common point as the predetermined position when the acceptance is obtained from the user.

23. The boarding point determination method according to claim 13, wherein the vehicle has an autonomous travel function.

24. A boarding point determination apparatus used in a vehicle allocation system configured to move a vehicle to a predetermined point in response to a request from a user, the boarding point determination apparatus comprising a processor that operates to:
    set a predetermined range including a point associated with a first user;
    specify a second user who is expected to board in the predetermined range and is different from the first user;
    calculate as the predetermined point a common point at which users including the first user and the second user board;
    generate a route for the vehicle from a current location of the vehicle obtained by a GPS device to the common point; and
    control, by a vehicle controller, the vehicle to move along the route,
    wherein, in calculating the common point, the processor operates to:

calculate a cost calculated from any one or more of a time for the first user to reach the common point, a distance for the first user to reach the common point, and a load for the first user to reach the common point as an access cost for the first user;

calculate a cost calculated from any one or more of a time for the second user to reach the common point, a distance for the second user to reach the common point, and a load for the second user to reach the common point as an access cost for the second user;

compare the access cost for the first user with the access cost for the second user different from the first user; and calculate as the common point a point for which a determination is made that the access cost for the first user and the access cost for the second user are equivalent and at which the first user and the second user are to board the vehicle.

25. A boarding point determination apparatus used in a vehicle allocation system configured to move a vehicle to a predetermined point in response to a request from a user, the boarding point determination apparatus comprising a processor that operates to:

set a predetermined range including a point associated with a first user;

specify a second user who is expected to board in the predetermined range and is different from the first user;

calculate as the predetermined point a common point at which users including at least the first user and the second user board;

generate a route for the vehicle from a current location of the vehicle obtained by a GPS device to the common point; and navigate, by a vehicle controller, the vehicle to move along the route, wherein, in calculating the common point, the processor operates to:

calculate a cost calculated from a time for the first user to reach the common point as an access cost for the first user;

calculate a cost calculated from a time for the second user to reach the common point as an access cost for the second user;

calculate a cost calculated from a time for the vehicle to reach the common point as an access cost for the vehicle;

compare the access cost for the vehicle with the access cost for the first user and the access cost for the second user; and calculate as the common point a point for which a determination is made that the access cost for the vehicle, the access cost for the first user, and the access cost for the second user are equivalent and at which the first user and the second user are to board the vehicle.

* * * * *